US012715940B2

(12) United States Patent
Pozzer et al.

(10) Patent No.: US 12,715,940 B2
(45) Date of Patent: Aug. 25, 2026

(54) FLUIDIC SEAL APPARATUS FOR CONTINUOUS POLYMERIZATION PROCESS

(71) Applicant: Braskem S.A., Camaçari (BR)

(72) Inventors: Dihogenes Adriano Pozzer, São Paulo (BR); Élita Cavalli, São Paulo (BR); Olavo Martins Junior, São Paulo City (BR); Thiago Roberto Almeida, São Paulo (BR)

(73) Assignee: Braskem S.A., Camaçari (BR)

(*) Notice: Subject to any disclaimer, the term of this patent is extended or adjusted under 35 U.S.C. 154(b) by 723 days.

(21) Appl. No.: 18/296,776

(22) Filed: Apr. 6, 2023

(65) Prior Publication Data

US 2024/0209123 A1 Jun. 27, 2024

Related U.S. Application Data

(60) Provisional application No. 63/434,863, filed on Dec. 22, 2022.

(51) Int. Cl.
*C08F 2/01* (2006.01)
*B01J 4/00* (2006.01)
*C08F 2/34* (2006.01)

(52) U.S. Cl.
CPC . *C08F 2/01* (2013.01); *C08F 2/34* (2013.01)

(58) Field of Classification Search
USPC ........................................................ 528/498
See application file for complete search history.

(56) References Cited

U.S. PATENT DOCUMENTS 6,689,845 B1 2/2004 Govoni et al.
9,539,556 B2 * 1/2017 Al-Haj Ali .............. C08F 10/00
10,702,842 B2 * 7/2020 Kanellopoulos ....... B01J 8/1863
2016/0108147 A1 4/2016 Penzo et al.

FOREIGN PATENT DOCUMENTS

WO 2018233999 A1 12/2018

* cited by examiner

*Primary Examiner* — Fred M Teskin
(74) *Attorney, Agent, or Firm* — Osha Bergman Watanabe & Burton LLP

(57) ABSTRACT

Described is a fluidic seal apparatus for continuously injecting a sealing gas into a bottom section of a gas-solids separation chamber. The fluidic seal apparatus includes an external section, a feed tube in fluid communication with a sealing gas supply, and an internal section. The external section connects the sealing gas supply to the internal section. The internal section includes gas distribution nozzles for distributing the sealing gas inside the bottom section of the gas-solids separation chamber. An internal chamber between the internal section and the external section is pressurized by the sealing gas.

25 Claims, 8 Drawing Sheets

FLUIDIC SEAL APPARATUS FOR CONTINUOUS POLYMERIZATION PROCESS

BACKGROUND

Process of alpha-olefin polymerization typically employs gas-solids separation steps for sending unreacted hydrocarbons to recovery systems and for concentrating polymer particles in the bottom section of a gas-solids separation chamber. However, an amount of remaining process gas may stay entrained between the polymer particles in the bottom section of the gas-solids separation chamber. The entrained gas may then be transferred to a subsequent polymerization reactor or to one or more degassing systems.

Gas-solids separators used in polymerization processes typically have a tangential entrance in a top section to receive polymer particles from a previous polymerization step. The tangential entrance promotes the separation of the polymer particles through cyclone physics. The cyclone physics produce a downward flow and an upward flow. The downward flow is a mixture of polymer particles and entrained gas, which is transferred to a gas phase reactor or a degassing system. The upward flow is unreacted gas from the prior polymerization reactor, which is routed to the hydrocarbons recovery system.

Gas phase reactors used for the polymerization, or co-polymerization, of olefins encounter difficulties in controlling the gas composition at low levels of molecular weight regulator agents when prior reaction stages require a high concentration of molecular weight regulator agent. The gas mixture entrained between the polymer particles in the bottom section of the gas-solids separation chamber may contain a high amount of molecular weight regulator agent. The molecular weight regulator agent may be carried out to the gas phase reactor with the entrained gas, thereby limiting the minimum ratio of molecular weight regulator agent/monomer and, thus, the viscosity of rubber products.

The U.S. Pat. No. 6,689,845 B1 discloses a process for catalytic polymerization in the gas-phase carried out in at least two interconnected polymerization zones, where the gas composition present in the first polymerization zone is different from the second polymerization zone, and gases present in the first polymerization zone are prevented from being introduced into the second polymerization zone. A gas and/or liquid mixture of different compositions is introduced into the downcomer, said barrier feed, to establish a net flow upward to prevent the gas mixture present in the riser from entering the downcomer. According to the examples, the barrier feed is propylene, a mixture of ethylene, propane and butene, or a mixture of propylene and hydrogen.

US 2016/0108147 A1 describes a process for transferring polyolefin particles from a first gas-phase polymerization reactor to a second gas-phase polymerization reactor, including the step of discharging the polyolefin particles into a separation chamber. A fluid is introduced into the lower part of the separation chamber to replace the reaction gas of the first gas-phase polymerization reactor acting as a barrier to prevent the reaction gas of the first gas-phase polymerization reactor from being transferred to the second polymerization reactor. It is also possible to feed the fluid at more than one position into the lower part of the separation chamber. In some embodiments, the fluid is fed in such a way that it is distributed over the whole cross-section of the separation chamber in a region above the fluid introduction point. The introduced fluid may be a component of the reaction gas mixtures of both the first and the second gas-phase polymerization reactors, such as propane, ethane, butane, pentane, hexane and nitrogen. The amount of feed fluid may be regulated in a way that an effective upward stream of the fluid in the bed of polyolefin particles above the fluid introduction is induced and reliably sustained. For certain embodiments, the amount of introduced fluid may be restricted, as an expansion of the bed should be avoided.

WO2018/233999 A1 provides a process for continuously removing polymer material from a gas-solids olefin polymerization reactor comprising an outlet vessel with a barrier gas injection point and a feed pipe connecting the gas-solids olefin polymerization reactor with the top part of the outlet vessel. The injection of the barrier gas is in a section of the bottom part of the outlet vessel below the powder surface to significantly reduce the amount of gas mixture entrained in the polymer powder. The gas is an inert gas, such as propane, nitrogen, or fluidization gas. The powder surface and the barrier gas injection point are situated in the outlet vessel to fulfill the criteria: $R'=X/Y\leq 2.0$ and $R''=X/D\geq 1.0$, wherein X is the distance between the powder surface and the barrier gas injection point, Y is the distance between the barrier gas injection and the vessel outlet, and D is the equivalent outlet vessel diameter. According to the examples, the barrier gas efficiency reached 98% for a powder flow of 200 kilograms per hour (kg/h), barrier gas flow of 120 pounds per hour (l/h), $R'=0.58$ and $R''=1.55$.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein relate to a fluidic seal apparatus for continuously injecting a sealing gas into a bottom section of a gas-solids separation chamber. The fluidic seal apparatus includes an external section and a feed tube extending from a sealing gas supply to a connection with the external section. The feed tube is configured to continuously feed the sealing gas to the fluidic seal apparatus. The fluidic seal apparatus further includes an internal section including gas distribution nozzles configured to distribute the sealing gas inside the bottom section of the gas-solids separation chamber. An internal chamber is formed between the internal section and the external section, when connected to each other. The external section connects the sealing gas supply to the internal section, and the internal chamber is pressurized by the sealing gas.

Other aspects and advantages of the claimed subject matter will be apparent from the following description and the appended claims.

DETAILED DESCRIPTION

Figure 1:
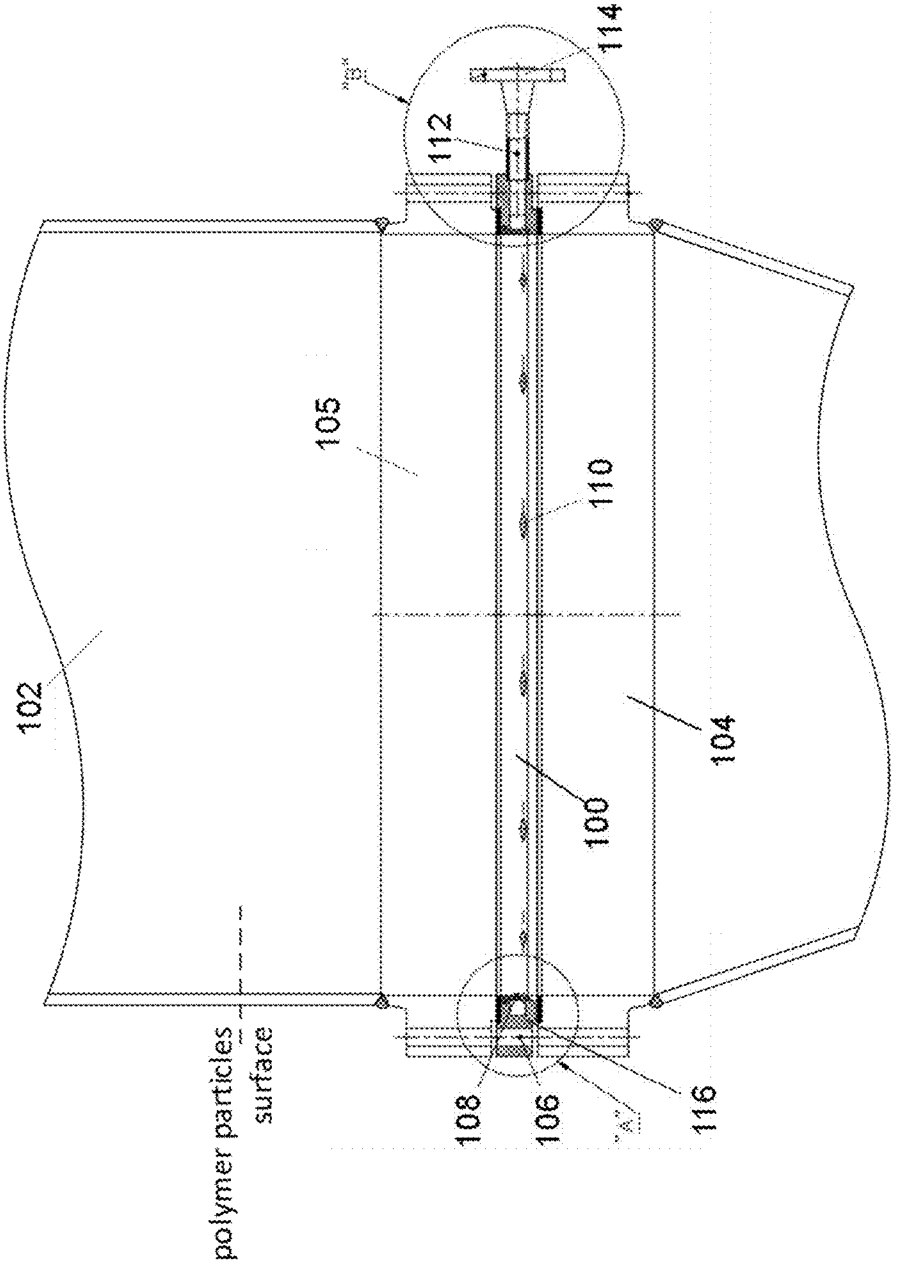
FIG. 1 illustrates a front view of a fluidic seal apparatus in connection with a bottom section of a gas-solids separation chamber and polymer particles surface indication above flange according to embodiments of the present disclosure.

Described is a fluidic seal apparatus for use in a gas-solids separation chamber of a continuous polymerization process. The fluidic seal apparatus according to embodiments of the present disclosure is positioned within an existing gas-solids separation chamber, so as to be connected to the bottom section of the gas-solids separation chamber. In one embodiment, the fluidic seal apparatus is placed between two flanges of the gas-solids separation chamber. The fluid seal apparatus is configured to inject a sealing gas into the bottom section of the gas-solids chamber, and its design also includes the advantage of requiring minor changes to be installed in an existing gas-solids separation chamber. For the purposes of this disclosure, sealing gas refers to a gas that is introduced into a gas-solids separation chamber through the fluidic seal apparatus described herein. The sealing gas may act to partially or totally substitute the process gas from a prior polymerization reactor that is entrained between the polymer particles. The sealing gas is injected in a specific flow pattern which does not disturb the separation of the gas and solids and reduces the amount of gas that flows downwards in the bottom outlet of the gas-solids separation chamber.

The injection of the sealing gas prevents a molecular weight regulator from a prior polymerization reactor from entering the polymerization gas phase reactor. In one or more embodiments, the process of injecting a sealing gas in the bottom section of the gas-solids separation chamber is carried out continuously in the presence of polymer particles that come from the prior polymerization reactor.

In some embodiments, by adopting the correct parameters to design the apparatus to inject sealing gas in a gas-solids separation chamber, the fluidic seal apparatus can significantly reduce the molecular weight regulator content that is forwarded to the gas phase reactor, in addition to preventing changes in cyclone pattern that impair gas-solids separation, prevent the particles fluidization, and the formation of a blocking effect, so as to reduce the polymer particles flowrate in the bottom outlet of the gas-solids separation chamber limiting production rates. The blocking effect refers to a reduction in the flowrate of polymer particles in the bottom outlet of the gas-solids separation chamber due to use of a poor fluidic seal design or process conditions, such as high flowrates leading to a high Reynolds number, unfavorable direction of the gas distribution nozzles, a low number of gas distribution nozzles, or the location of the sealing gas injection point. The blocking effect causes a reduction in the transversal area available for the downwards flow of polymer particles.

Various parameters needed to be optimized together to design the fluidic seal apparatus and, then, to achieve its advantageous features. The parameters optimized in the fluidic seal apparatus include the Reynolds number, the direction and number of gas nozzles in the gas distributor, and the sealing fluid injection point. Each of these parameters is described in detail below.

FIG. 1 illustrates a front view of the fluidic seal apparatus 100 connected into a bottom section of a gas-solids separation chamber 102 placed between two flanges 104 and 105. The fluidic seal apparatus 100 includes a ring-shaped external section 106, which is connected with a ring-shaped internal section 108. The external section 106 and the internal section 108 are concentric. A ring is formed by the connection between the external section 106 and the internal section 108. The ring may be comprised of a metal material, a plastic material, or any other suitable material.

The external section 106 connects a gas supply with the internal section 108. The internal section 108 distributes a sealing gas in a specific direction and Reynolds number into the gas-solids separation chamber 102 via gas distribution nozzles 110, which are distributed in the internal section 108, as described in detail below. The sealing gas is continuously fed to the bottom section of the gas-solids separation chamber 102 during a polymerization process. In the embodiment depicted in FIG. 1, the internal section 108 faces an internal surface of the bottom section of the gas-solids separation chamber 102 to avoid "dead-spaces". Dead-space refers to stagnant zones where active polymer particles may get trapped and continue reacting.

The sealing gas may comprise propylene with a low concentration of molecular weight regulator, nitrogen, propylene alone, propane, or any combination thereof. The sealing gas is fed into the fluidic seal apparatus 100 via a feed tube 112. The feed tube 112 extends from the sealing gas supply to a connection with the external section 106. In one embodiment, the fluidic seal apparatus 100 may be installed between two or more flanges 104 and 105 positioned below the polymer particles surface in the bottom section of the gas-solids separation chamber 102.

The gas distribution nozzles 110 are located in the internal section 108 for distribution of the sealing gas into the bottom section of the gas-solids separation chamber 102. In one or more embodiments, the gas distribution nozzles 110 are annular in shape.

The sealing gas supply may be connected to a flange 114 of the fluidic seal apparatus 100 through which the sealing gas enters. When entering the fluidic seal apparatus 100, the sealing gas passes through a chamber 116 formed in the space between the external section 106 and the internal section 108, when connected to each other. Thereafter, the sealing gas passes through the gas distribution nozzles 110 of the internal section 108, each of which may have a smaller diameter than the feed tube 112. Because of the smaller area of the gas distribution nozzles 110 compared to the feed tube 112, the fluidic seal apparatus 100 causes the sealing gas to be fed to the bottom section of the gas-solids separation chamber 102 at a turbulent flow regime. As understood by one skilled in the art, the Reynolds number is used to characterize flow patterns in different fluid flow situations. Lower Reynolds numbers generally indicate flows dominated by sheet-like flow, while higher Reynolds numbers generally indicate turbulent flows. The flow regime produced by each gas distribution nozzle 110 may fulfill the Reynolds number range of 250,000 to 450,000, such as 290,000 to 312,000. An inlet of gas that exits the gas distribution nozzles 110 in the bottom section of the gas-solids separation chamber 102 occurs with a velocity that avoids the blocking effect and particles fluidization.

In one embodiment, the sealing gas may be heated with a heater to form a homogeneous single-phase mixture of gas prior to the fluidic seal injection. In another embodiment, the sealing gas composition may be cooled with a cooler prior to the fluidic seal injection to reduce the gas temperature, thereby avoiding the formation of hot spots. In one or more embodiments, the sealing gas is fed in the bottom section of the gas-solids separation chamber 102 at a temperature less than 100° C., preferably at a temperature between 60° C. and 90° C., or between 75° C. and 85° C.

The sealing gas may include a polymerization reaction monomer, a comonomer, a molecular weight regulator, an inert gas, or any combination thereof. The polymerization reaction monomer, comonomer, and inert gas may be selected from saturated or unsaturated hydrocarbons having from 2 to 12 carbon atoms and nitrogen. In one embodiment, the molecular weight regulator is hydrogen. In another embodiment, the molecular weight regulator is 1-butene. In some embodiments, the sealing gas may be propylene with a low concentration of molecular weight regulator (up to 1000 parts per million (ppm)), nitrogen, propylene alone, or propane.

Figure 2:
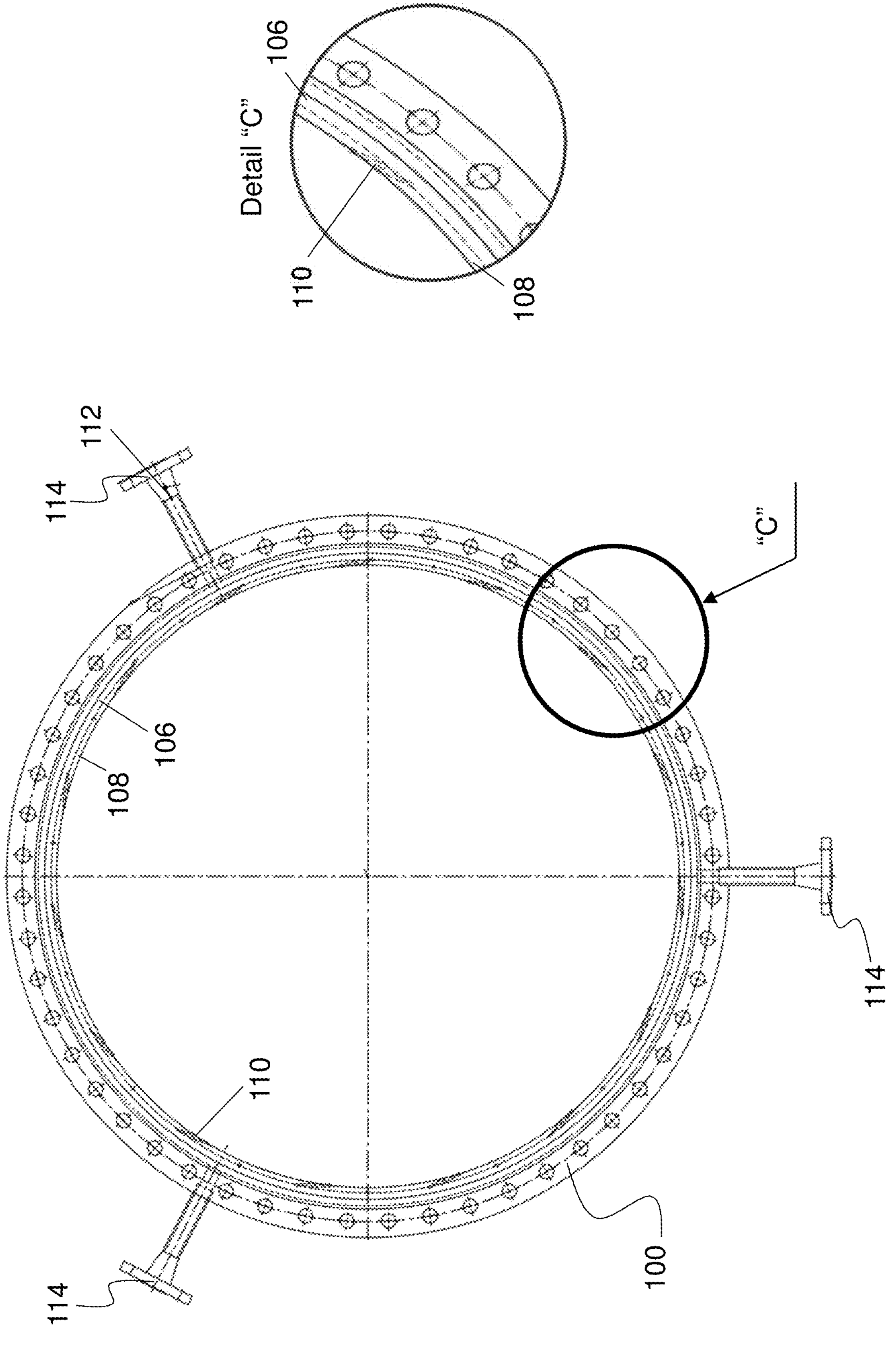
FIG. 2 illustrates a top view of the fluid seal apparatus according to embodiments of the present disclosure.

FIG. 2 shows a top view of the fluidic seal apparatus 100. In one or more embodiments, the gas distribution nozzles are at an angle 110 (represented by dashed lines) relative to a tangent to the internal section 108 of between 10 degrees and 20 degrees, such as 18 degrees, to avoid breaking the cyclone physics, as shown in Detail "C". FIG. 2 depicts three flanges 114 of the fluidic seal apparatus 100 and the feed tube 112 connected to the external section 106, forming an angle of approximately 90 degrees. In some embodiments, the flanges 114 are positioned at the same elevation, and the flanges 114 are spaced approximately 120 degrees from each other, as shown in FIG. 2. The gas distribution nozzles direct the gas flow from between 0 degrees to 90 degrees of the inside of the gas-solids separation chamber to avoid breaking the cyclone effect.

In one embodiment, the fluidic seal apparatus meets the following criteria:

$$250{,}000 \leq Re \leq 450{,}000,$$

$$d_1/d_2 \geq 100,$$

$$\text{and } 50 \leq d_1/n \leq 70,$$

wherein Re represents the Reynolds number in the gas distribution nozzles 110 located in the internal section 108; $d_1$ represents the internal diameter of the bottom section of the gas-solid separation chamber 102 where the fluidic seal apparatus 100 is installed; $d_2$ represents the internal diameter of each gas distribution nozzle 110 present in the internal section 108; and n represents the number of gas distribution nozzles 110 located in the internal section 108. In some embodiments, the gas distribution nozzles 110 in the internal section 108 may be evenly spaced from one another.

In one or more embodiments, the sealing gas is injected into the bottom section of a gas-solids separation chamber that contains polymer particles. In some embodiments, the polymer particles may comprise a d(0.5) ranging from 800 micrometers (μm) to 2500 μm. Here, d(0.5), also referred to as D50, means that 50% of the particles have a distribution particle size from 800 to 2500 μm.

Figure 4:
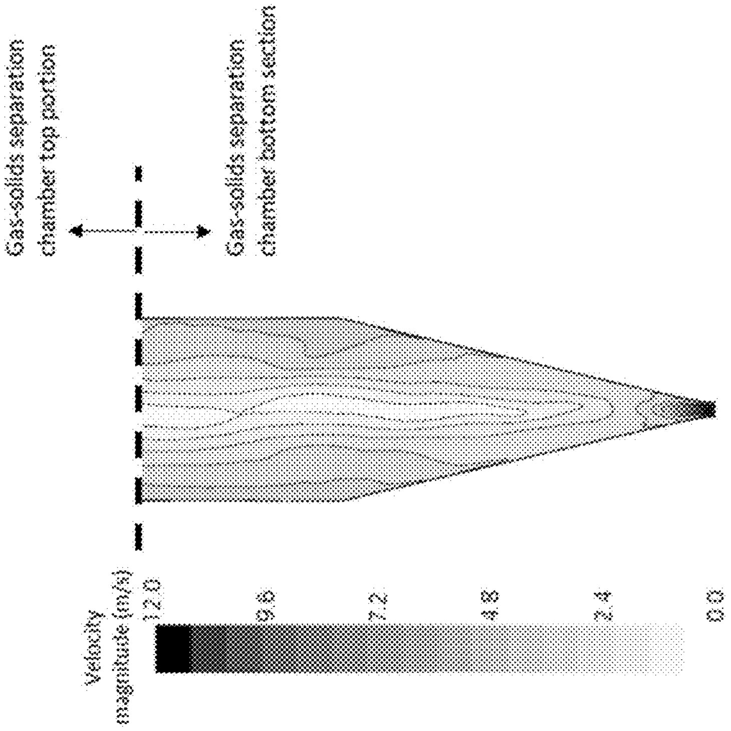
FIGS. 3 and 4 illustrate simulation results of an expected flow pattern of a bottom section of a gas-solids separation chamber without the sealing gas according to embodiments of the present disclosure.
Figure 3:
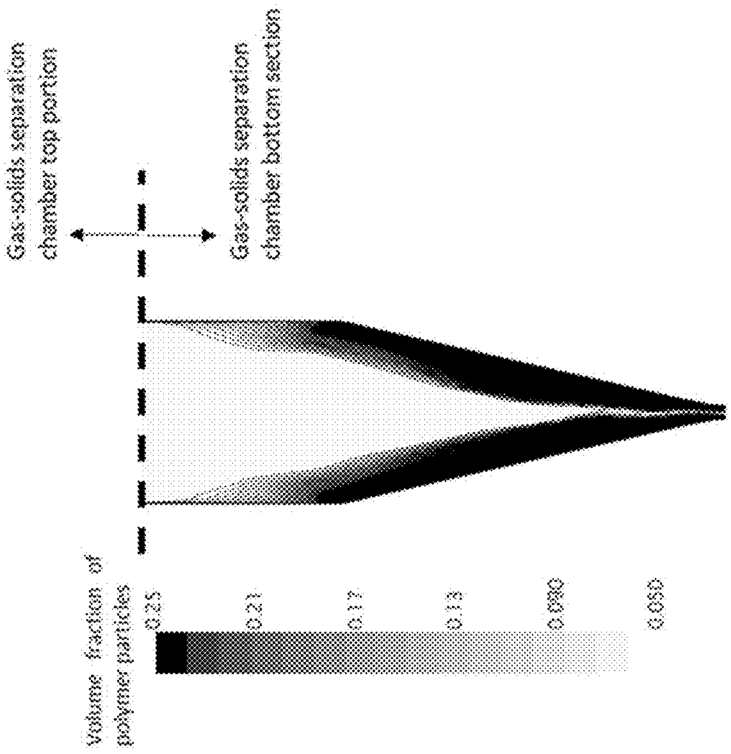

In some embodiments, the polymer particles surface and the sealing gas injection point are situated in the bottom section of the gas-solids separation chamber according to the following criteria:

$$0.58 \leq d_1/L \leq 10,$$

wherein L represents the height of the polymer bed above the fluidic seal apparatus 100 injection point. FIGS. 3 and 4 depict simulation results, without the fluidic seal apparatus, showing the expected flow pattern in which, the high concentration of polymer particles are in the bottom portion of the gas-solids separation chamber near to the walls and the cyclone physics by the central low velocity vortex.

In one embodiment, the polymerization step is carried out in a liquid phase reactor prior to the gas-solids separation chamber and thereafter submitted to gas phase polymerization, optionally with addition of C2-C12 alpha-olefin comonomers. The bottom content of the liquid phase reactor follows to the gas-solids separation chamber for subsequent gas phase polymerization. In some embodiments, the fluidic seal apparatus described herein is used in the polymerization process of olefins homopolymers or copolymers having monomer and comonomer units from 2 to 12 carbon atoms (C2-C12).

In one or more embodiments, a prior polymerization step may incorporate a liquid phase reactor that discharges to a high temperature flash system that is connected to the gas-solids separation chamber. In some embodiments, the gas-solids separation chamber includes at least one conical section and one straight section in which the polymer bed height may be controlled.

In one or more embodiments, a powder surface of polymer particles may be present in the bottom section of the gas-solids separation chamber. Powder surface denotes the upper surface of polymer particles present in the bottom section of the gas-solids separation chamber.

An internal diameter of the fluidic seal apparatus 100 may be related to the powder surface according to the following criteria: $d_1/L=0.58$ to 10, more preferably 1 to 6, where $d_1$ represents the internal diameter of the fluidic seal apparatus, and L represents a distance between a sealing gas injection point and the powder surface.

In some embodiments, the fluidic seal apparatus may be located in a straight section of the gas-solids separation chamber.

In one or more embodiments, the bottom section of the gas-solids separation chamber, in which the sealing gas is fed, may include one or more of the following characteristics:

- Cyclonic physics introduce a regime that forces the polymer particles to flow near to the gas-solids separation chamber walls. The concentration of polymer particles in the walls is up to 0.25 in volume fraction of polymer particles, which is the polymer volume divided by the sum of the volumes of all constituents of the mixture.
- The maximum polymer particles concentration in the walls of the gas-solids separation chamber is at least three times higher than the minimum polymer particles concentration in the bottom section of the gas-solids separation chamber.

The cyclonic physics introduce an upward flow of gas that presents a pattern of a low velocity vortex of up to 2.5 meters/second (m/s).
The temperature in the bottom section of the gas-solids separation chamber is in a range of 60° C. to 120° C.
The gas-solids separation chamber operates in a pressure range of 0.05 to 4 MegaPascal (MPa). The polymer particles d(0.5) is up to 2500 μm.

METHODS AND EXAMPLES

Computational fluid dynamics (CFD) simulations were performed in order to determine the best configuration for the fluidic seal apparatus 100. CFD simulations allow one to perform computer simulations of equipment and industrial processes. During experimental studies, simulations were performed with two different approaches: fixed bed simulation and dynamic bed simulation.

(1) Fixed Bed Simulation

The fixed bed simulations were carried out with the Euler-Lagrange approach, using a DEM (Discrete Element Method) multiphase model to simulate the Lagrangian phase (dispersed phase). DEM method provides detailed resolution, when compared to other methods, due to the calculation of the trajectory of each particle within the computational domain. Therefore, DEM is known to require high computational power. However, for the fixed bed simulations, the particles trajectory is calculated only in the first iterations, until the solids bed is formed, respecting variables such as volume and solids concentration. After the bed formation, the solver for the Lagragian phase is turned off. The particle trajectory calculations are note calculated, so the particles are frozen in space; only the Eulerian phase (fluid phase) calculation is executed.

The fixed bed simulations simulated different geometric possibilities and different process variables. Using DEM with the solver frozen considerably reduced the simulation time and enabled testing of different conditions in a short period of time and thus to select the most promising cases for the following steps (dynamic bed simulations).

(2) Dynamic Bed Simulations

For the dynamic bed, the approach used in the simulations was the Euler-Euler formulation, or Eulerian Multiphase Model (EMP), where each phase within the computational domain has its own set of conservation equations. The EMP approach uses the concept of "interpenetrating continua", or coexisting phases, and assumes that the user is interested in the time average behavior of the flow, rather than instantaneous behavior.

In the EMP approach the pressure is assumed to be the same in all phases. The volume fraction gives the share of the flow domain that each phase occupies. Each phase has its own velocity and physical properties. Within the EMP some extra models are used, such as the Segregate Solver, which is responsible for separately calculating pressure and velocity solvers. The Granular Pressure Model and the Granular Temperature Model are responsible for estimating the stresses of solid phases and calculating the collisions and motions of particles below the packing limit, respectively.

The EMP model is well known for its robustness in providing optimal accuracy. However, the EMP model is an approach that is extremely sensitive and difficult to numerically converge, requiring a small time-step (1E-05 seconds or lower, initially), high number of inner iterations, and low under relaxation factors especially at the beginning of the simulations. All of these characteristics lead to a longer simulation time.

(3) Examples

(3.1) Example 1 (Base Case)

In this example, an existing gas-solids separation chamber is simulated using the CFD tool to validate the models through a comparison between simulation results and industrial data. The CFD approach for this evaluation was dynamic modeling. The height of the polymer particles surface in the straight section of the gas-solids separation chamber was set to 579 millimeters (mm). The volume ratio of process gas to polymer particles that entered the gas-solids separation chamber was set to 27.1. The process gas was a mixture of propylene, propane, and hydrogen. The polymer particles were homopolymer polypropylene with d(0.5) of 1200 μm. The gas-solids separation chamber operated at a temperature of 86.3° C. and a pressure of 19.6 bar. Sealing gas was not injected for this simulation. As shown in FIGS. 3 and 4, the simulation results showed the expected flow pattern in which a high concentration of polymer particles is at the bottom section of the gas-solids separation chamber near the walls and cyclone physics by the central low velocity vortex. The hydrogen volumetric flowrate in the process gas that leaves the gas-solids separation chamber in the bottom outlet was 0.88 $m^3$/h.

(3.2) Example 2

For this example, the CFD tool was applied using the fixed bed approach simulating the fluidic seal apparatus according to embodiments of the present disclosure with various numbers of gas distribution nozzles in the internal section. In some embodiments, the number of gas distribution nozzles may range from 2 to 16 nozzles. The simulation was performed with gas distribution nozzles in a 900 orientation with a tangential entrance of approximately 18°. The conditions of entrance flow, temperature, and pressure were equivalent to those described in Example 1. The distance between the fluidic seal gas injection site and the surface of the polymer particles was set to 380 mm. The fluidic seal gas was propylene in an amount of 29.4 cubic meters per hour ($m^3$/h).

Figure 5:
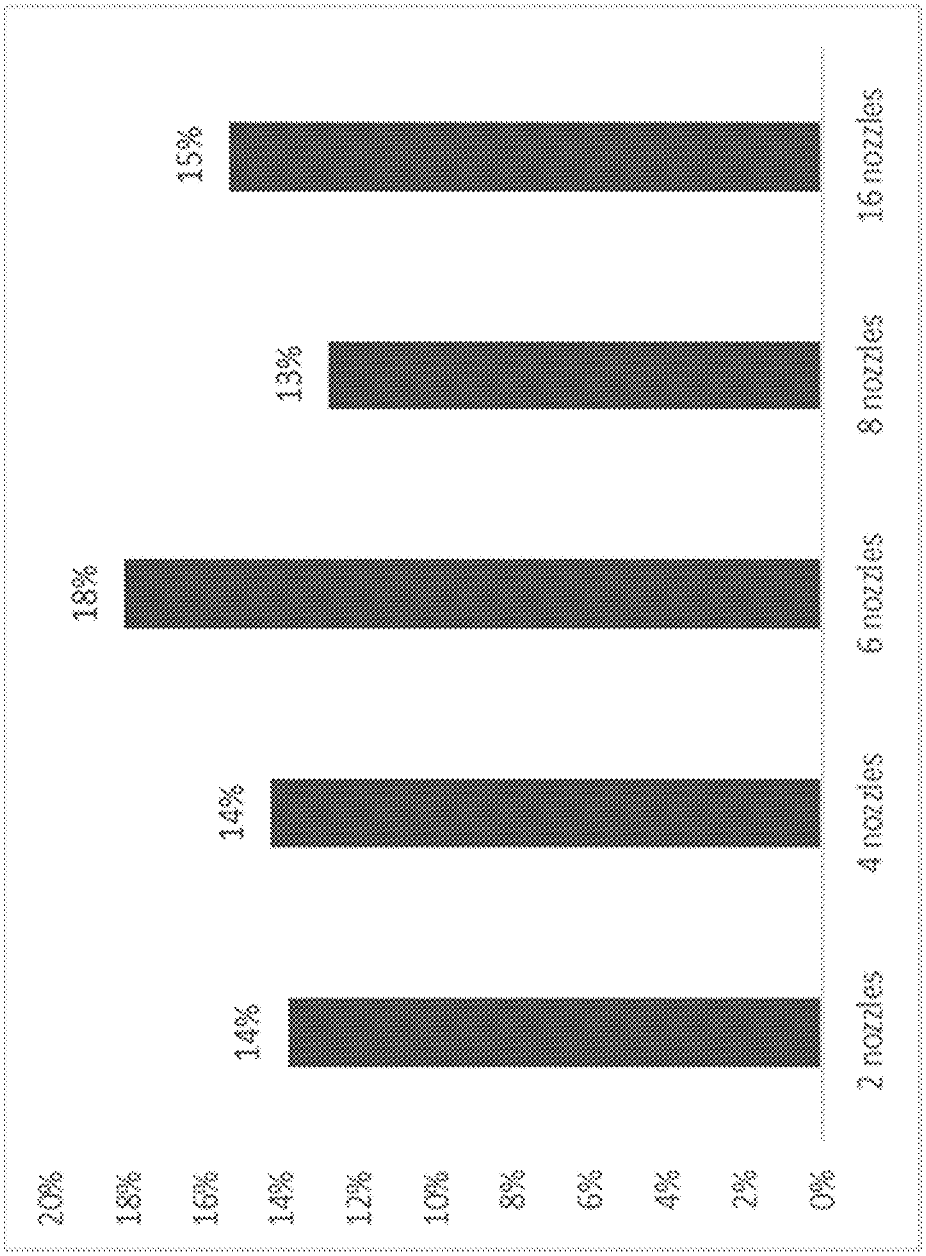
FIG. 5 illustrates a comparison of reduction in volumetric flowrate of hydrogen leaving the gas-solids separation chamber by number of gas distribution nozzles according to embodiments of the present disclosure.

The simulation results indicated that the gas distribution nozzles in the orientation of 90° increased the volumetric flowrate of hydrogen that leaves the gas-solids separation chamber in the bottom outlet by at least 32%. Additionally, the gas distribution nozzles in the tangential orientation reduced the volumetric flowrate of hydrogen that leaves the gas-solids separation chamber in the bottom outlet by at least 14%. Simulations performed with gas distribution nozzles of 6 and 16 represented the highest reduction values of 18% and 15%, respectively, as shown in FIG. 5.

(3.3) Example 3

For this example, the CFD tool was applied using the dynamic bed approach simulating the fluidic seal apparatus with 16 tangential gas distribution nozzles at 180 in the internal section. The same entrance flow, temperature, and pressure as Example 1 were implemented. The same distance between the fluidic seal gas injection site and the polymer particles surface, fluidic seal gas, and volumetric flowrate as Example 2 were implemented.

Figure 6:
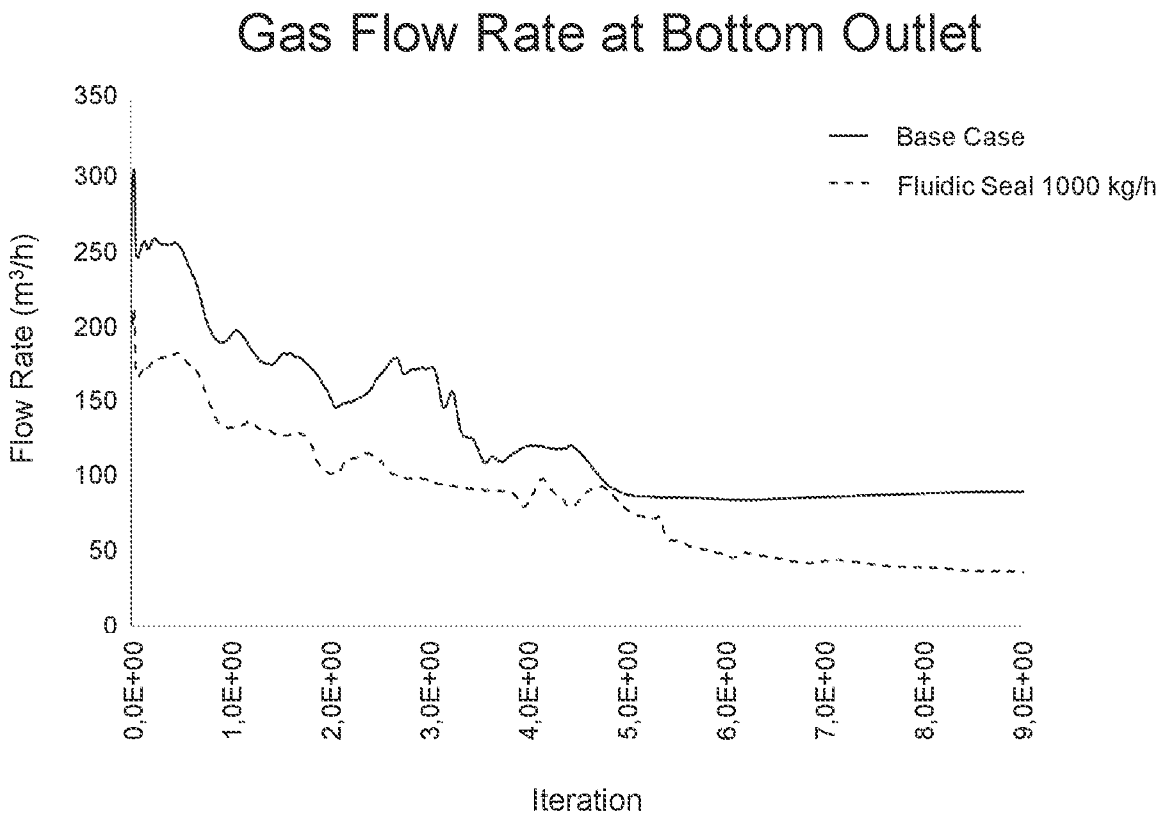
FIG. 6 illustrates volumetric gas flow rates in a bottom outlet of the gas-solids separation chamber with and without the fluid seal apparatus according to embodiments of the present disclosure.
Figure 7:
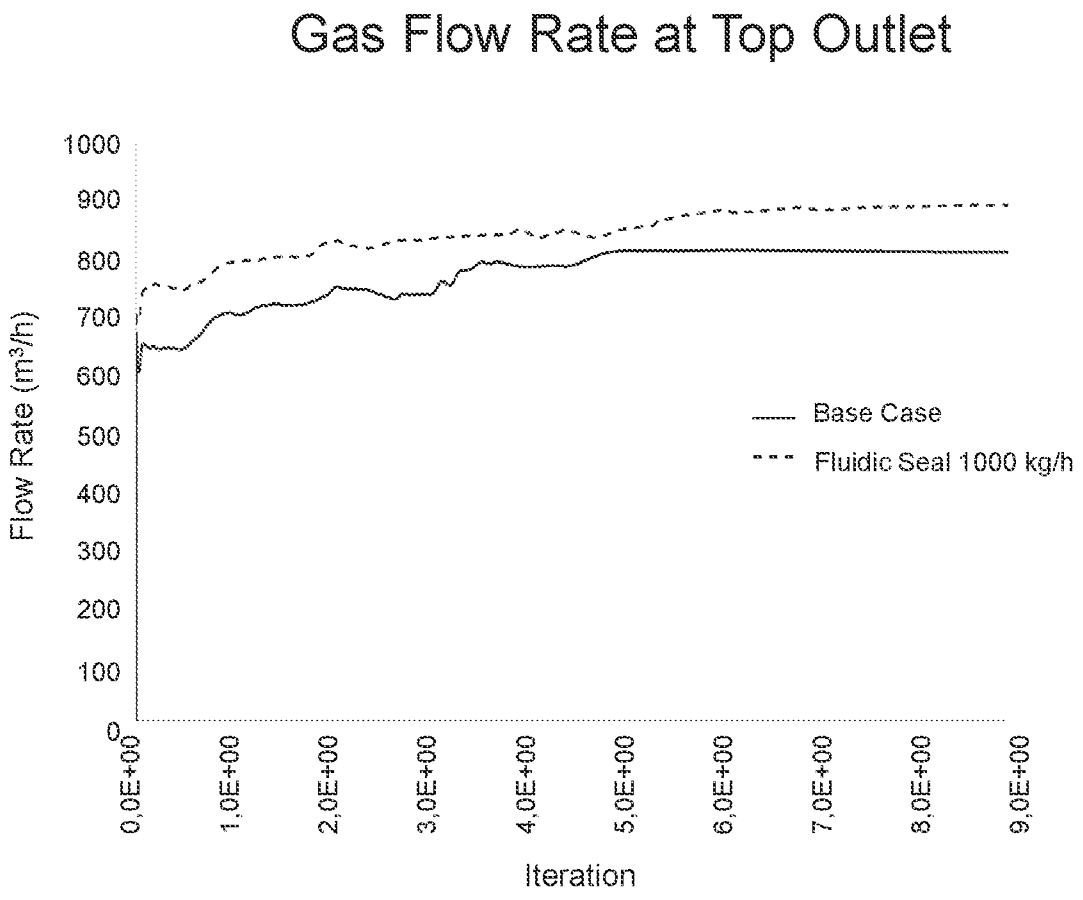
FIG. 7 illustrates volumetric gas flow rates in a top outlet of the gas-solids separation chamber with and without the fluid seal apparatus according to embodiments of the present disclosure.

As illustrated in FIG. 6, the simulation results indicated that the volumetric flowrate of process gas in the bottom outlet of the gas-solids separation chamber when using the fluidic seal apparatus (represented by dashed line) decreased by 62% compared with the base case from Example 1 (represented by solid line). Additionally, as shown in FIG. 7, the volumetric flowrate of process gas in the top outlet of the gas-solids separation chamber when using the fluid seal apparatus (represented by dashed line) increased by 10% compared with the base case from Example 1 (represented by solid line).

Figure 8:
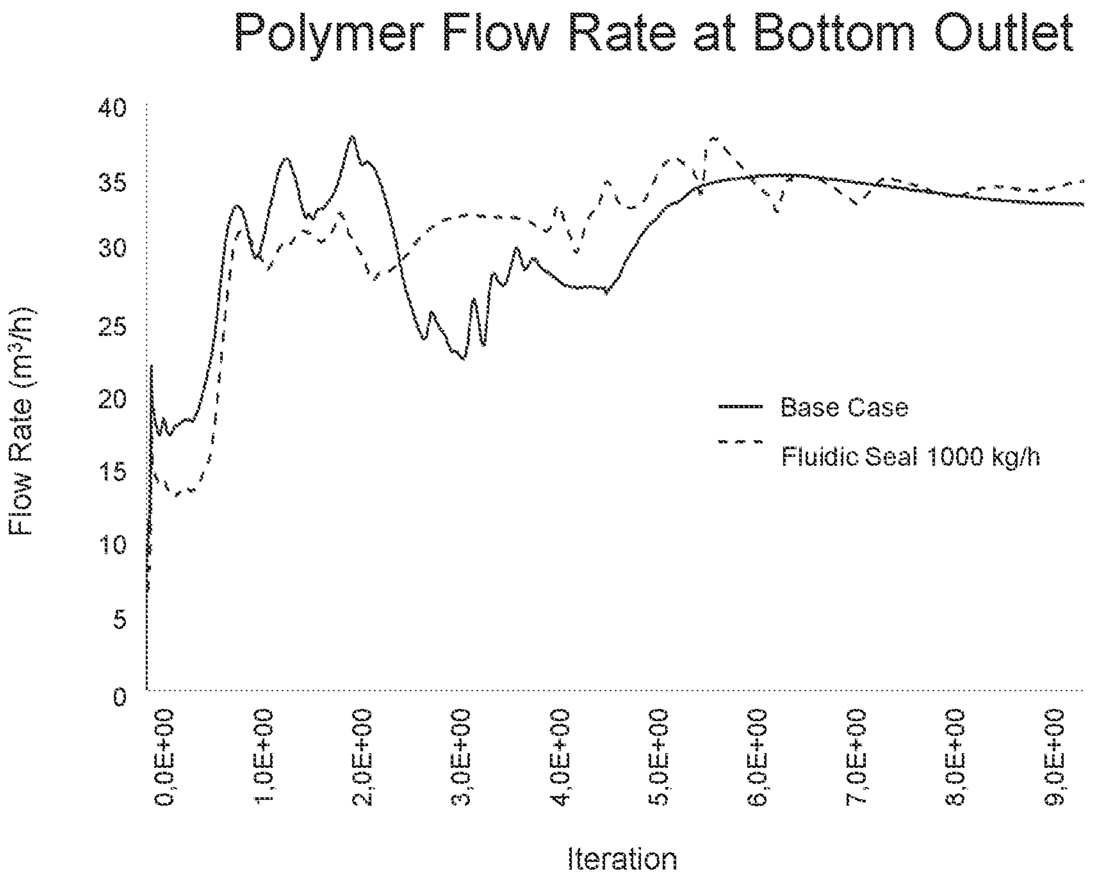
FIG. 8 illustrates polymer flow rates at a bottom outlet of the gas-solids separation chamber with and without the fluid seal apparatus according to embodiments of the present disclosure.
Figure 9:
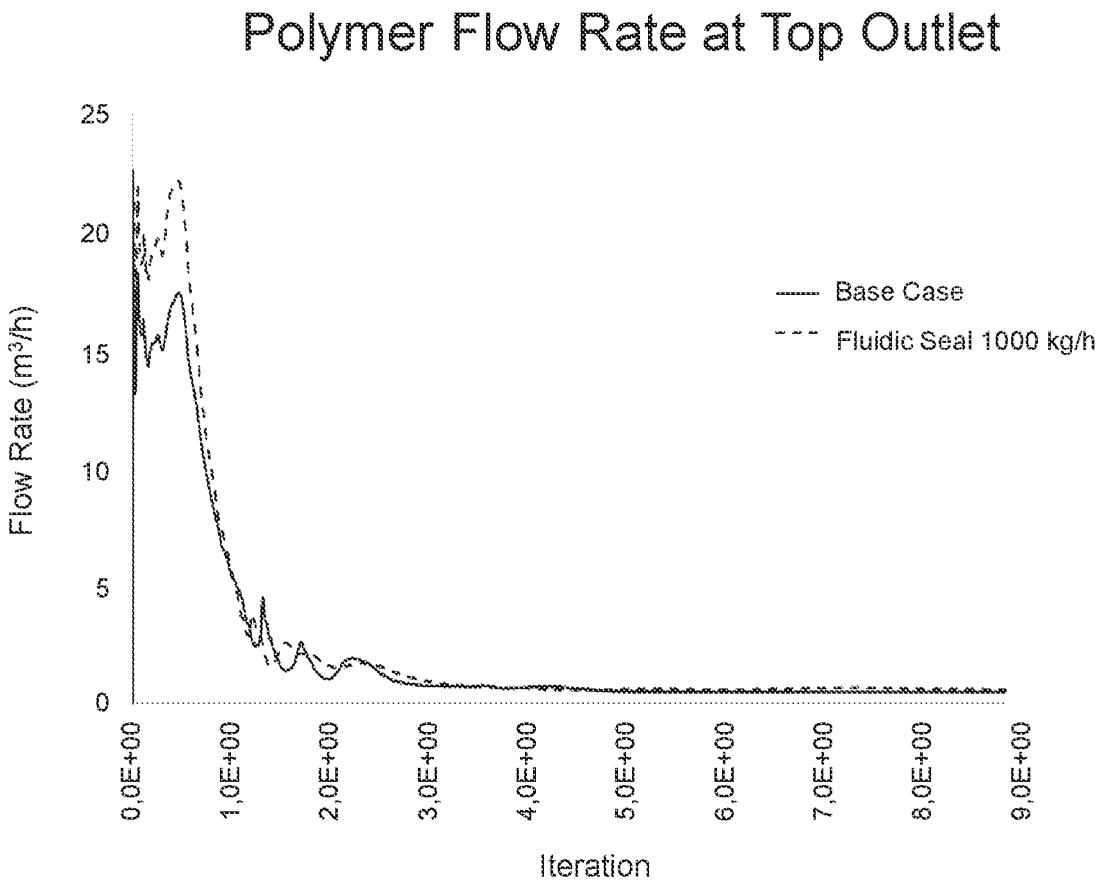
FIG. 9 illustrates polymer flow rates at a top outlet of the gas-solids separation chamber with and without the fluid seal apparatus according to embodiments of the present disclosure.

As shown in FIG. 8, the volumetric flowrate of polymer particles in the bottom outlet of the gas-solids separation chamber when using the fluidic seal apparatus (represented by dashed line) decreased by approximately 1% compared to the base case from Example 1 (represented by solid line). As shown in FIG. 9, the volumetric flowrate of polymer particles in the top outlet of the gas-solids separation chamber when using the fluidic seal apparatus (represented by dashed line) increased by approximately 8% compared with the base case from Example 1 (represented by solid line). The total amount of sealing gas volumetric flowrate was split, where 30% partially substituted the process gas in the bottom section of the gas-solids separation chamber and the rest presented an upward flow. In other words, 30% of the total flowrate goes to the bottom section, while the other 70% goes to the top section of the equipment. The volumetric flowrate of hydrogen in the bottom outlet of the gas-solids separation chamber was reduced by approximately 72%.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed is:

1. A fluidic seal apparatus for continuously injecting a sealing gas into a bottom section of a gas-solids separation chamber, comprising:

an external section;

a feed tube extending from a sealing gas supply to a connection with the external section, wherein the feed tube is configured to continuously feed the sealing gas to the fluidic seal apparatus;

an internal section comprising a plurality of gas distribution nozzles, each gas distribution nozzle configured to distribute the sealing gas inside the bottom section of the gas-solids separation chamber; and an internal chamber formed between the internal section and the external section, when connected to each other, wherein the external section connects the sealing gas supply to the internal section, and wherein the internal chamber is pressurized by the sealing gas.

2. The fluidic seal apparatus of claim 1, wherein a flow regime produced by each gas distribution nozzle comprises a Reynolds number in a range of 250,000 to 450,000.

3. The fluidic seal apparatus of claim 1, wherein a flow regime produced by each gas distribution nozzle comprises a Reynolds number in a range of 290,000 to 312,000.

4. The fluidic seal apparatus of claim 1, wherein each gas distribution nozzle is positioned at the same elevation in the internal section.

5. The fluidic seal apparatus of claim 1, wherein the plurality of gas distribution nozzles is evenly distributed throughout the internal section.

6. The fluidic seal apparatus of claim 1, wherein the plurality of gas distribution nozzles is configured to distribute the sealing gas flow tangentially.

7. The fluidic seal apparatus of claim 1, wherein each gas distribution nozzle comprises an internal diameter, and wherein the internal diameter of one or more of the plurality of gas distribution nozzles is related to an internal diameter of the fluidic seal apparatus according to the following criteria:

$$d_1/d_2 \geq 100$$

wherein $d_1$ represents the internal diameter of the fluidic seal apparatus, and $d_2$ represents the internal diameter of the one or more gas distribution nozzles.

8. The fluidic seal apparatus of claim 1, wherein a number of gas distribution nozzles in the plurality of gas distribution nozzles is related to an internal diameter of the fluidic seal apparatus according to the following criteria:

$$d_1/n = 50 \text{ to } 70$$

wherein $d_1$ represents the internal diameter of the fluidic seal apparatus, and n represents the number of gas distribution nozzles.

9. The fluidic seal apparatus of claim 1, wherein a powder surface of polymer particles is present in the bottom section of the gas-solids separation chamber, and wherein the fluidic seal apparatus is positioned below a level established by the powder surface.

10. The fluidic seal apparatus of claim 9, wherein an internal diameter of the fluidic seal apparatus is related to the powder surface according to the following criteria:

$$d_1/L = 0.58 \text{ to } 10,$$

wherein $d_1$ represents the internal diameter of the fluidic seal apparatus, and L represents a distance between a sealing gas injection site and the powder surface.

11. The fluidic seal apparatus of claim 1, wherein the fluidic seal apparatus is located in a straight portion of the gas-solids separation chamber.

12. The fluidic seal apparatus of claim 9, wherein the polymer particles are selected from a group consisting of olefin homopolymers and copolymers having olefin units having 2 to 12 carbon atoms.

13. The fluidic seal apparatus of claim 1, wherein the sealing gas is one or more of propylene, propylene containing a molecular weight regulator up to 1000 parts-per-million (ppm), propane, and nitrogen.

14. The fluidic seal apparatus of claim 13, wherein the molecular weight regulator is one of hydrogen or 1-butene.

15. The fluidic seal apparatus of claim 1, wherein the fluidic seal apparatus is engageable with the bottom section of the gas-solids separation chamber.

16. The fluidic seal apparatus of claim 1, wherein the sealing gas is injected into the bottom section of the gas-solids separation chamber at a temperature of about 60° C. to about 90° C.

17. The fluidic seal apparatus of claim 1, wherein the sealing gas is injected into the bottom section of the gas-solids separation chamber at a temperature of about 75° C. to about 85° C.

18. The fluidic seal apparatus of claim 1, wherein the external section is connected with a plurality of flanges to feed the sealing gas into the internal chamber.

19. The fluidic seal apparatus of claim 1, wherein the external section is connected to at least two flanges to feed the sealing gas into the internal chamber.

20. The fluidic seal apparatus of claim 1, wherein the external section is connected with three flanges to feed the sealing gas into the internal chamber.

21. The fluidic seal apparatus of claim 18, wherein the connection between the flanges and the external section forms an angle of 90 degrees.

22. The fluidic seal apparatus of claim 1, wherein the sealing gas injection reduces the total volumetric flowrate of sealing gas that is carried out to a polymerization gas phase reactor by at least 50%.

23. An apparatus for reducing the amount of molecular weight regulator carried out to a polymerization gas phase reactor process, wherein a feeding zone in which a sealing gas is fed to a gas-solids separation chamber, comprises:

(i) a maximum polymer particles concentration in walls of the gas-solids separation chamber of at least three times higher than a minimum polymer particles concentration in a bottom section of the gas-solids separation chamber;

(ii) a cyclonic physics that introduces an upward flow of gas presenting a pattern of a low velocity vortex up to 2.5 meters per second;

(iii) a temperature in a range of 60° C. to 120° C.;

(iv) a pressure in a range of 0.05 megapascal (MPa) to 4 MPa; and (v) a d (0.5) of polymer particles in the feeding zone of up to 2500 micrometers (μm).

24. A process for reducing an amount of molecular weight regulator carried out to a polymerization gas phase reactor, comprising:

continuously feeding a sealing gas to a fluidic seal apparatus connected with a bottom section of a gas-solids separation chamber; and using the fluidic seal apparatus, injecting the sealing gas to a feeding zone in the bottom section of the gas-solids separation chamber, wherein the sealing gas injection reduces a total volumetric flowrate of sealing gas that is carried out to the polymerization gas phase reactor by at least 50%.

25. The process of claim 24, wherein injecting the sealing gas further comprises:

introducing an upward flow of sealing gas that presents a pattern of a low velocity vortex up to 2.5 meters per second (m/s), wherein a maximum polymer particles concentration in walls of the gas-solids separation chamber is at least three times higher than a minimum polymer particles concentration in the bottom section of the gas-solids separation chamber, wherein a temperature of the feeding zone is in a range of 60° C. to 120° C., wherein a pressure in the feeding zone is in a range of 0.05 megapascal (MPa) to 4 MPa, and wherein a d(0.5) of polymer particles in the feeding zone is up to 2500 micrometers (μm).

* * * * *